United States Patent
Gardner et al.

(10) Patent No.: US 9,586,299 B2
(45) Date of Patent: Mar. 7, 2017

(54) NON-SLIP MAT FOR LATHE

(71) Applicants: Martin Gardner, Franklin, TN (US);
Charles Weber, Onalaska, WI (US);
Benjamin Carlson, Holmen, WI (US)

(72) Inventors: Martin Gardner, Franklin, TN (US);
Charles Weber, Onalaska, WI (US);
Benjamin Carlson, Holmen, WI (US)

(73) Assignee: JPW Industries Inc., La Vergne, TN (US)

( * ) Notice: Subject to any disclaimer, the term of this patent is extended or adjusted under 35 U.S.C. 154(b) by 0 days.

(21) Appl. No.: 14/959,957

(22) Filed: Dec. 4, 2015

(65) Prior Publication Data

US 2016/0158902 A1 Jun. 9, 2016

Related U.S. Application Data

(60) Provisional application No. 62/088,835, filed on Dec. 8, 2014.

(51) Int. Cl.
*B23Q 3/00* (2006.01)
*B23Q 1/03* (2006.01)
*B23B 25/00* (2006.01)

(52) U.S. Cl.
CPC .............. *B23Q 1/032* (2013.01); *B23B 25/00* (2013.01); *B23B 2260/122* (2013.01); *B23Q 3/00* (2013.01)

(58) Field of Classification Search
CPC ..... A47L 23/22; A47L 23/26; B23Q 3/15526; B23Q 3/02; B23Q 3/00
See application file for complete search history.

(56) References Cited

U.S. PATENT DOCUMENTS

| | | | |
|---|---|---|---|
| 3,919,949 A | 11/1975 | Rendleman | |
| 4,599,769 A | 7/1986 | Latzko et al. | |
| 4,868,961 A * | 9/1989 | Coleman | B44B 3/006 29/33 Q |
| 6,505,444 B1 * | 1/2003 | Johnson | A47L 23/24 15/215 |
| 6,635,331 B2 * | 10/2003 | Kessler | A47L 23/26 428/100 |
| 6,740,380 B2 * | 5/2004 | Kessler | A47L 23/24 428/45 |
| 6,783,829 B2 * | 8/2004 | Arena | A47L 23/266 15/215 |
| 7,028,434 B2 * | 4/2006 | Kessler | A01K 1/0157 52/177 |
| 7,810,483 B2 * | 10/2010 | Gifford | B23D 47/02 125/13.01 |
| D650,730 S * | 12/2011 | Jeackjuntra | A61G 13/102 D12/203 |

(Continued)

FOREIGN PATENT DOCUMENTS

| | | |
|---|---|---|
| CN | 203471752 U | 3/2014 |
| EP | 2000240 A2 | 12/2008 |
| JP | 2006008224 A | 1/2006 |

OTHER PUBLICATIONS

Extended European Search Report dated May 3, 2016.

*Primary Examiner* — Will Fridie, Jr.
(74) *Attorney, Agent, or Firm* — Schiff Hardin LLP (57) ABSTRACT

A lathe or other rotating machine includes a chuck for holding a work piece or tool. The chuck is operated between grasping and releasing positions. At least one non-slip mat rests on the housing of the rotating machine, including raised edges.

18 Claims, 7 Drawing Sheets

(56) References Cited

U.S. PATENT DOCUMENTS

| | | | | |
|---|---|---|---|---|
| 8,534,225 B2 * | 9/2013 | Vermeegen | .......... | A01K 5/0114 |
| | | | | 119/421 |
| 8,668,973 B2 * | 3/2014 | Lohmeier | ................ | B32B 15/08 |
| | | | | 141/331 |
| 8,839,812 B2 * | 9/2014 | Tanhehco | ............. | A61G 13/102 |
| | | | | 137/312 |
| D734,231 S * | 7/2015 | Lu | ........................... | B23B 31/28 |
| | | | | D12/203 |
| 9,302,331 B1 * | 4/2016 | King | ....................... | B23B 47/30 |
| 2003/0069115 A1 * | 4/2003 | Binder | .................... | B23Q 1/015 |
| | | | | 483/36 |
| 2005/0277529 A1 * | 12/2005 | Luscher | ............. | B23Q 3/15526 |
| | | | | 483/1 |
| 2016/0158849 A1 * | 6/2016 | Coleman | ................. | B23B 31/28 |
| | | | | 82/118 |

\* cited by examiner

NON-SLIP MAT FOR LATHE

RELATED APPLICATION

The present application claims the benefit of the filing date of provisional application 62/088,835, filed Dec. 8, 2014 titled "CHUCK GUARD AND NON-SLIP MAT FOR LATHE", inventors Gardner et al.

BACKGROUND

Field

The present invention relates generally to a lathe or other rotating machine, and more particularly to an item resting surface for a lathe or other rotating machine.

Description of the Related Art

A lathe holds a work piece from one or both ends as the work piece is rotated at relatively high speed. Tools such as cutting and shaping tools are moved into contact with the rotating work piece to shape the work piece. A lathe is commonly used to form spindles, table legs, chair legs, crank shafts, and other rotationally formed portions, which are held from both ends. A lathe may also be used to form bowls or the like by mounting the work piece so that it is held at a single end.

Lathes may be used to shape wood, metal, or other materials. The work piece materials are supported by a chuck that is connected to a motor which operates to rotate the chuck and the work piece, typically at high speed. The work piece is engaged in the chuck by adjusting the chuck to engage the work piece so that the work piece may be shaped, and the work piece is released from the chuck by adjusting the chuck so that the shaped work piece may be removed from the lathe. The chuck typically includes grasping elements that move toward and away from one another symmetrically about the rotational center of the chuck. The grasping elements may be moved using a tool referred to as a chuck key. The chuck key is inserted into a key receiving opening on the chuck and is rotated to operate gear mechanisms within the chuck that move the grasping elements.

In addition to lathes, drills, drill presses, routers, cutting, sanding and shaping tools, powered screw drivers and wrenches and other tools may have chucks. In drills, drill presses, and the like, the chuck is operable to hold a tool, such as a drill bit.

SUMMARY OF THE INVENTION

The lathe according to certain embodiments includes at least one non-slip mat mounted on the housing. The non-slip mat is preferably on a horizontal surface of the housing, although the mat location is not limited to horizontal surfaces. The non-slip mat of certain embodiments is on a top of a portion of the housing adjacent the chuck, and in certain embodiments adjacent the chuck. Other surfaces of the lathe housing may include non-slip mats as well.

The mat provides a surface for placing items such as tools, work pieces or other parts or elements. The mat prevents vibration of the items or parts on the mat from vibrating, providing quieter operation. The mat provides sound damping as well.

DETAILED DESCRIPTION OF THE PREFERRED EMBODIMENTS

Figure 1:
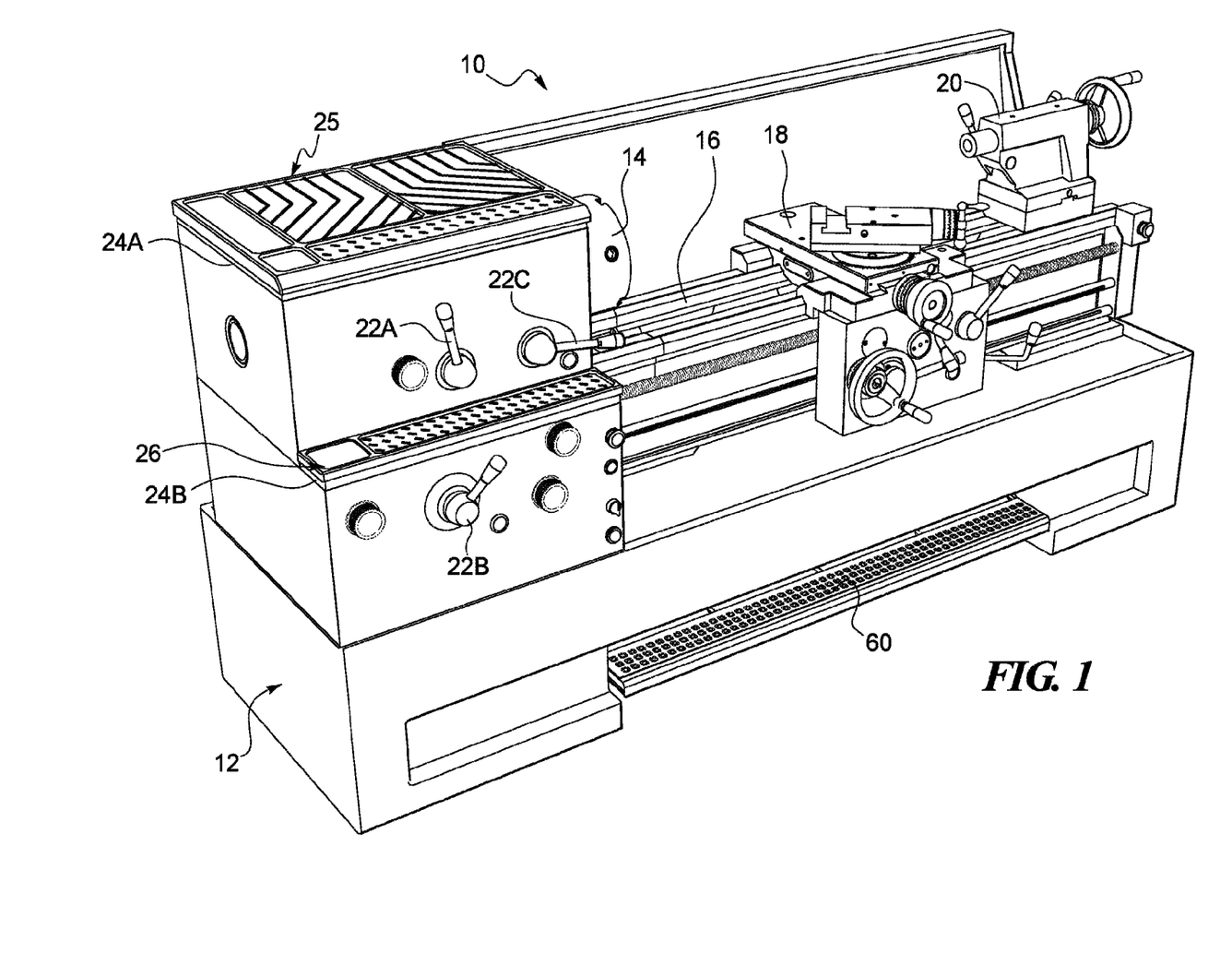
FIG. 1 is a perspective view of a lathe of a type that includes one or more non-slip mats for holding items.

In FIG. 1, a lathe 10 includes a housing 12 within which is mounted a motor (not shown) that drives a chuck or headstock 14 that holds a work piece. The lathe 10 includes a bed 16 on which is mounted a carriage 18 and at the end of which is mounted a tailstock 20. Controls 22A, 22B, 22C for the operation of the lathe 10 are provided on the housing 12.

The housing 12 of the lathe 10 includes horizontal surfaces 244 and 24B on which may be placed tools, parts, work pieces or other items. The horizontal surfaces 244 and 24B are provided with first and second respective non-slip mats 25 and 26 in certain embodiments. The housing 12 also includes an emergency break 60 on which a user may place a foot.

Figure 2:
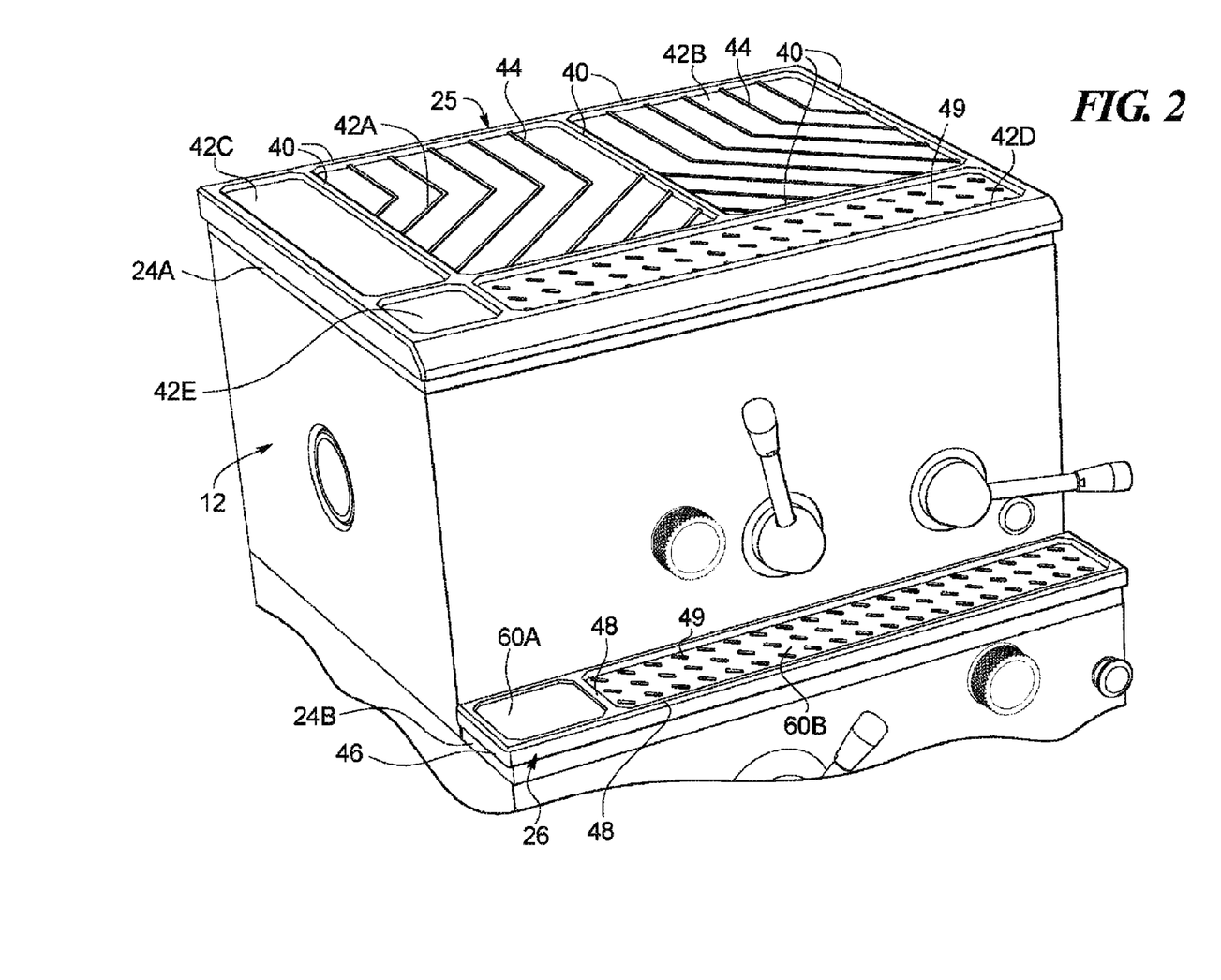
FIG. 2 is a partial perspective view of a portion of the lathe of FIG. 1 showing first and second non-slip mats.

Turning to FIG. 2, the non-slip mats 25 and 26 are provided on the respective horizontal surfaces 24A and 24B of the housing 12. The non-slip mat 25 includes raised ribs 40 that extend upward interiorly and also at the edges to prevent items from rolling or vibrating off. The spaces 42A, 42B, 42C, 42D, 42E defined by the ribs 40 may be smooth or textured. In the illustrated embodiment, some of the spaces 42A and 42B include ridges 44 to prevent inadvertent movement of items placed on the mat Surface 24B comprises a small shelf 46 provided on the housing 12, the shelf 46 being provided with the second non-slip mat 26, that is somewhat similar in structure to the mat 25 on the top surface 24A. Raised edges, dividing ribs and ridges 48 are provided defining spaces 60A and 60B on the non-slip mat 26. Either or both mats 25 and 26 may be provided with raised portions 49 such as dots or circles, or other shapes such as an elongated oval shape as illustrated. Both mats 25 and 26 are of a soft, pliable material, such as rubber or the like, that avoids vibration of items placed on the mats and creates at least in part a non-slip characteristic of the mats.

Figure 3:
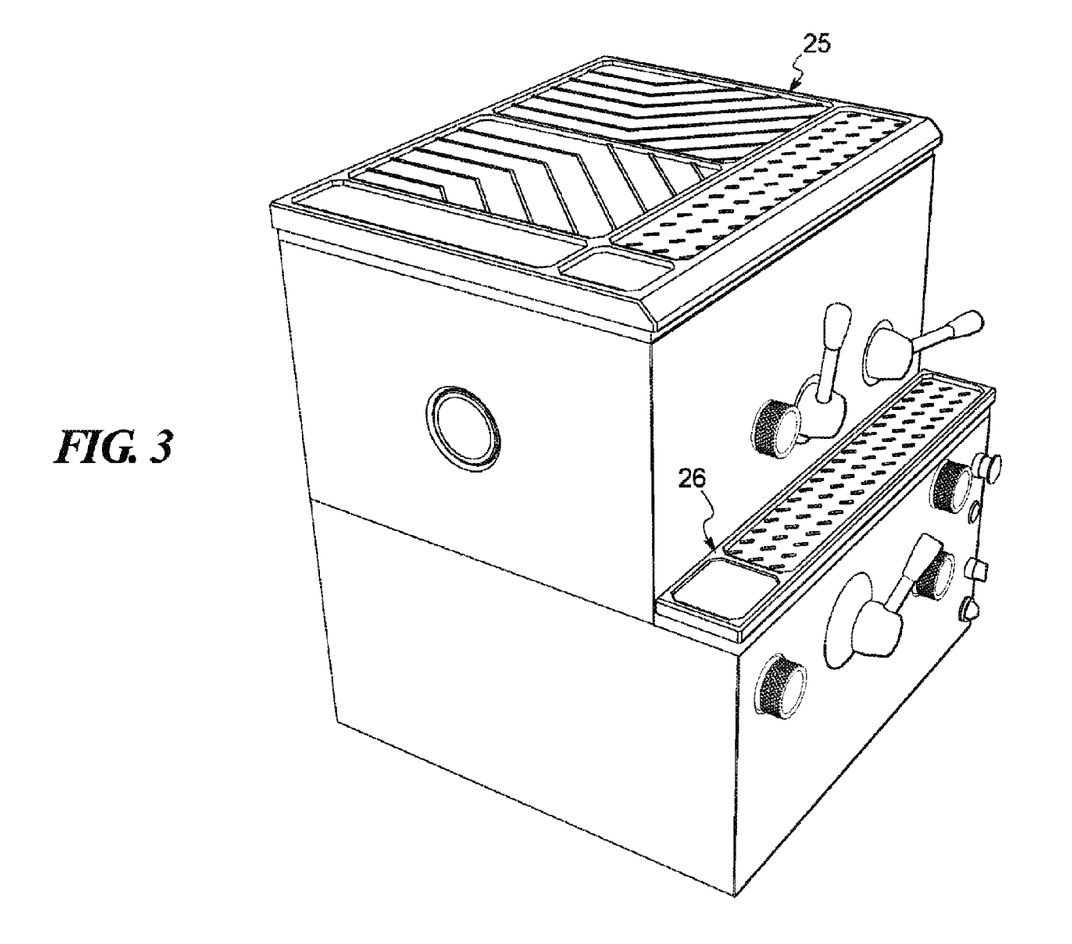
FIG. 3 is another perspective view of the non-slip first and second mats of FIG. 2 and lying on respective horizontal surfaces.

FIG. 3 shows in perspective the first and second mats 25 and 26 from a different perspective direction for clarity of viewing.

Figures 4, 5, 6:
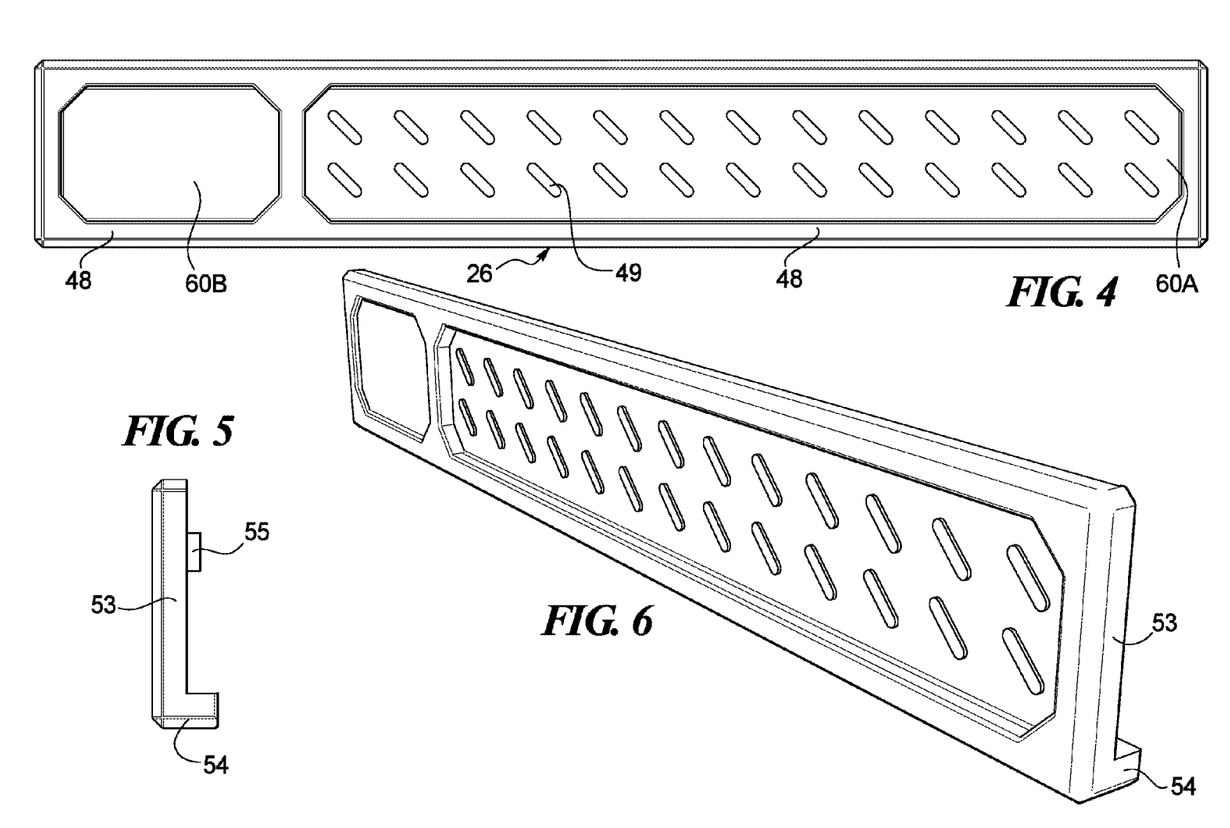
FIG. 4 is a top view of the second mat on a horizontal surface adjacent and near a bottom of the chuck of the lathe.
FIG. 5 is an end view of the second mat.
FIG. 6 is a perspective view showing the second mat in the orientation shown in FIG. 5.

FIG. 4 shows a plan view of the second mat 26 with the elongated oval raised portions 49 aligned within the space 60A defined by the surrounding raised rib 48. Also the space 60B defined by the raised rib 48 does not have raised portions 49.

FIG. 5 shows an end view of the second mat 26 with a main flat portion 53 for lying on the surface 24B and an overhanging lip portion 54 which overlies a front edge of the surface 24B. A perspective view showing the shape is illustrated in FIG. 6. A protrusion 55 runs almost an entire length of the mat and provides support for a top surface of the mat 26.

Figure 7:
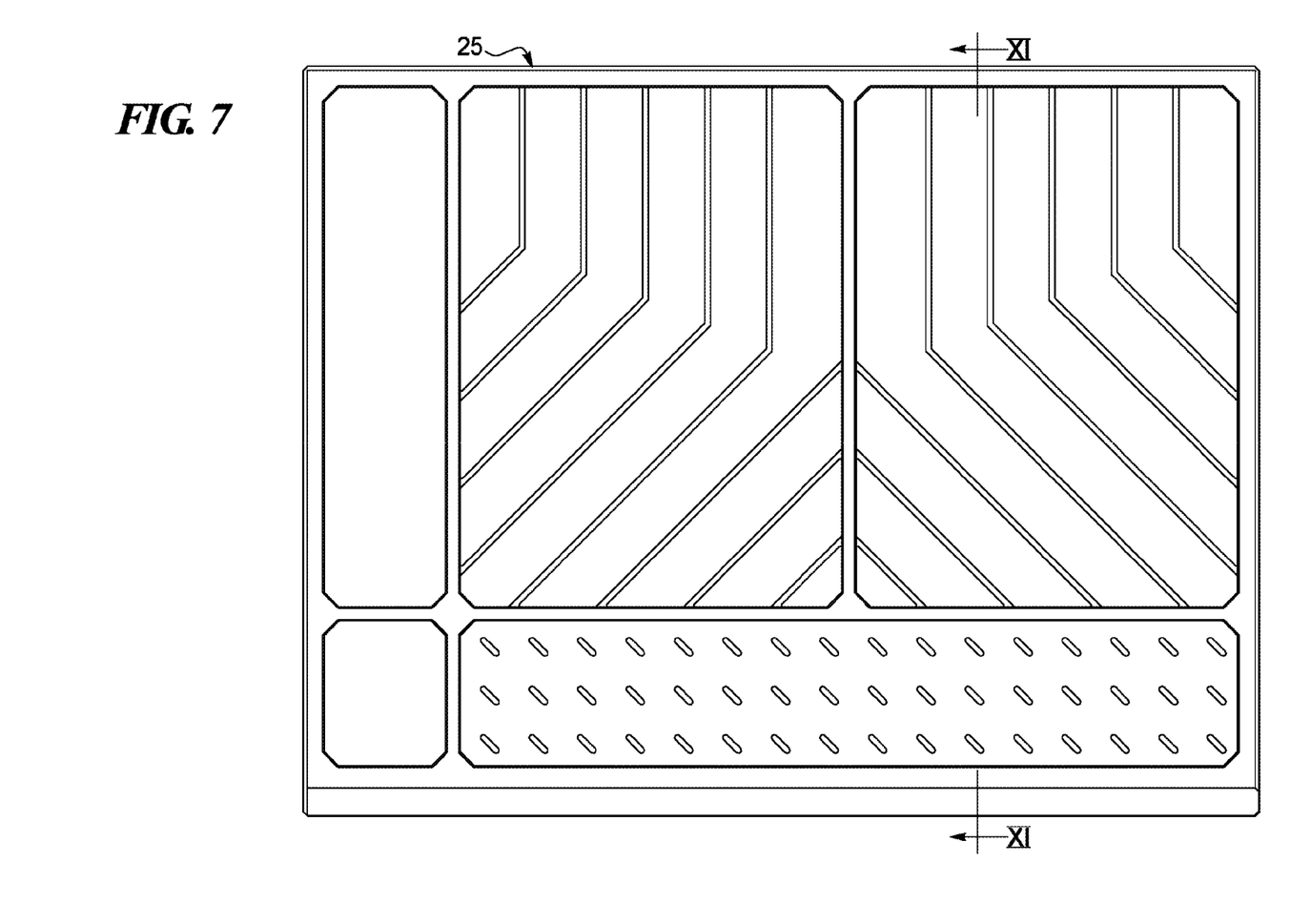
FIG. 7 is a top view of the first mat arranged on a surface of the housing adjacent to and above the chuck.

FIG. 7 shows a plan view of the first mat 25 for ease of viewing.

Figure 8:
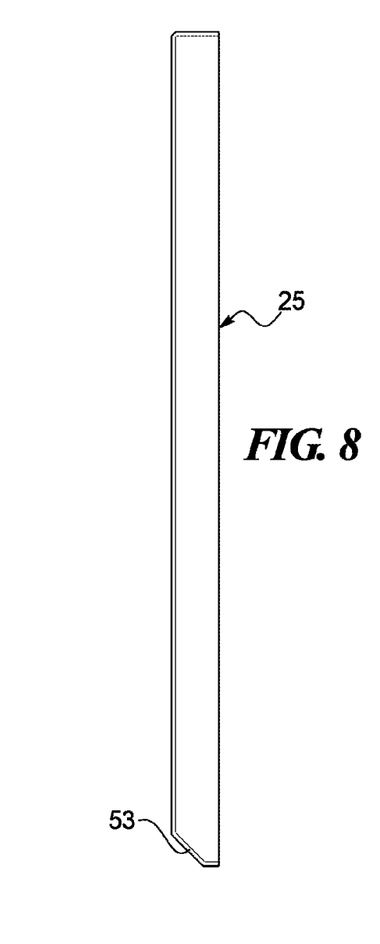
FIG. 8 is an end view of the first mat shown in FIG. 7.

FIG. 8 shows an end view of the first mat 25 in which a tapered portion 53 is illustrated at the front end of the mat 25.

Figure 9:
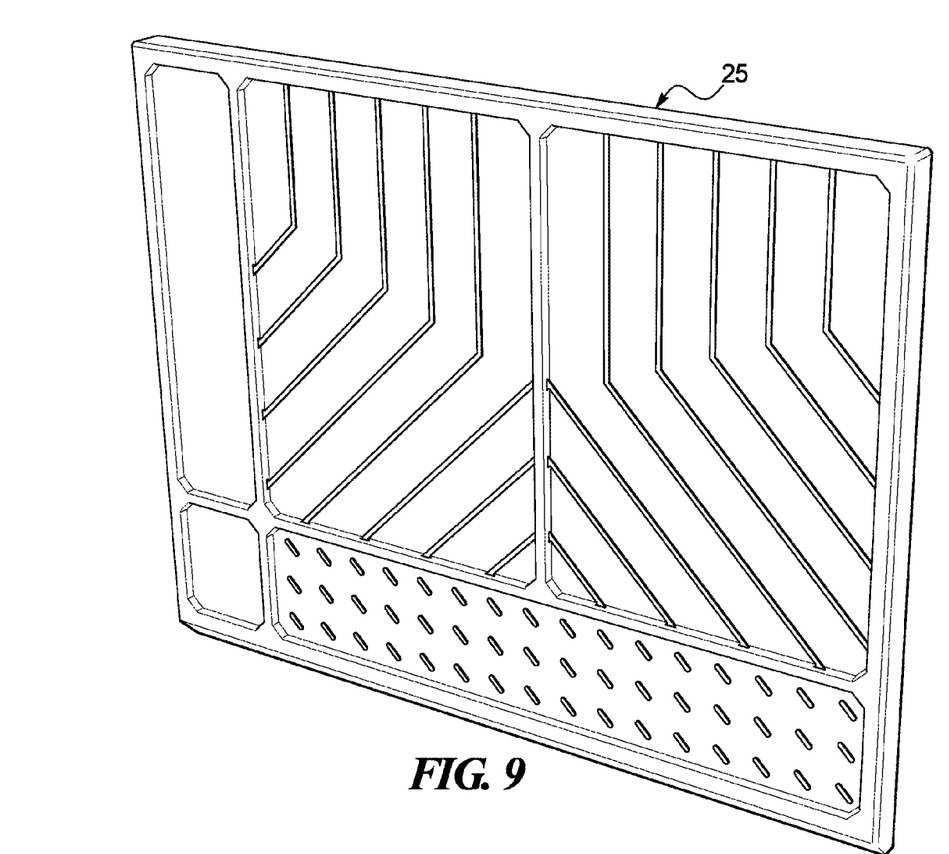
FIG. 9 is a perspective view of the first mat of FIG. 7.
Figure 10:
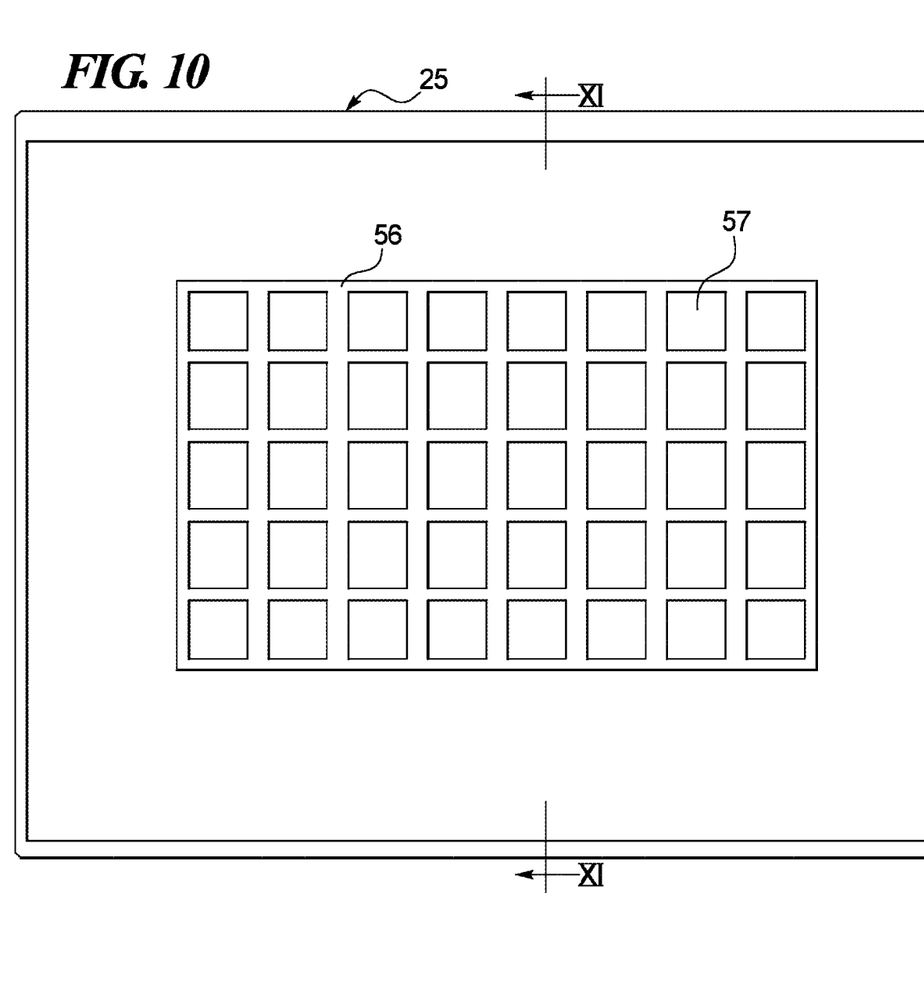
FIG. 10 is a bottom plan view of the first mat of FIG. 7.

FIG. 9 shows a perspective view of the first mat 25 also shown in FIG. 7,

FIG. 10 is a plan view of a bottom of the mat 25 showing raised ribs 56 defining pockets 57 on the bottom of mat 25. These raised ribs 56 as protrusions together with the material used for the mat, which is preferably rubber, result in the non-slip characteristics of the mat 25. The raised ribs 56 also support a top surface of the mat 25.

Figure 11:
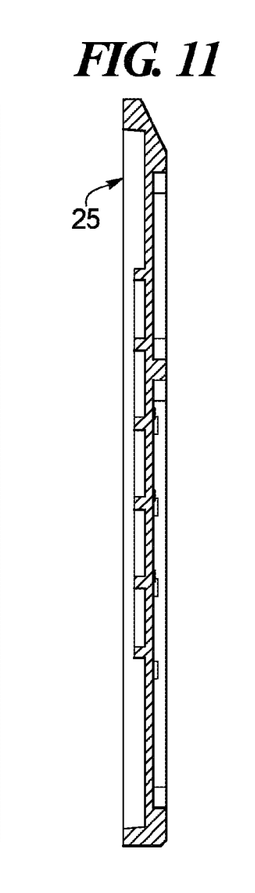
FIG. 11 is a cross-sectional view of the first mat of FIG. 7 taken along cross-sectional line X-X in FIG. 7 and in FIG. 10.

FIG. 11 shows a cross-sectional view taken along line X-X in FIGS. 7 and 10.

Thus there is shown and described one or more non-slip mats which may be provided on the lathe, such as on horizontal surfaces.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A rotating machine, comprising:
   a housing;
   a motor mounted in or on the housing and that is operable for rotational motion;
   a chuck connected for rotation by the motor, the chuck extending from the housing and including grasping elements that are movable relative to a rotational center of the chuck; and
   at least one non-slip mat mounted on a top horizontal surface of the housing, the at one non-slip mat being configured to receive a tool, the at least one non-slip mat being of a material and being structured to reduce vibration by a tool resting on the at least one non-slip mat while the motor is running.

2. The rotating machine as claimed in claim 1, wherein the at least one non-slip mat includes a plurality of non-slip mats resting on a plurality of respective horizontal surfaces of the rotating machine.

3. The rotating machine as claimed in claim 1, wherein the horizontal surface on which the least one non-slip mat is mounted is at a location of the housing adjacent to and above the chuck.

4. The rotating machine as claimed in claim 1, wherein the horizontal surface on which the at least one non-slip mat is resting is at a location of the housing adjacent to and near a bottom of the chuck.

5. The rotating machine as claimed in claim 1, wherein the at least one non-slip mat comprises a non-slip rubber material.

6. The rotating machine as claimed in claim 1, wherein the at least one non-slip mat has at least one protrusion at a bottom of the at least one non-slip mat to promote non-slipping of the mat and to support an upper surface of the mat.

7. The rotating machine as claimed in claim 6, wherein the at least one protrusion includes a plurality of protrusions provided at the bottom of the at least one non-slip mat.

8. The rotating machine as claimed in claim 1, further comprising:
   raised ribs along a periphery of the at least one non-slip mat at outside edges of the at least one non-slip mat.

9. The rotating machine as claimed in claim 8, further comprising:
   additional raised ribs provided interiorly of the outside edges to define a plurality of separate spaces.

10. The rotating machine as claimed in claim 9, wherein at least one of the separate spaces has projections having a height smaller than a height of the raised ribs.

11. The rotating machine as claimed in claim 9, wherein at least one of the separate spaces has elongated oval shaped projections.

12. The rotating machine as claimed in claim 1, wherein the at least one non-slip mat has an over hanging lip over-hanging a leading edge of said horizontal surface where said mat is resting.

13. The rotating machine as claimed in claim 1, wherein the chuck is a lathe chuck mounted to and operable to hold a workpiece for working on a lathe, and wherein the at least one non-slip mat is configured for supporting a tool for use with a lathe.

14. A tool shelf for a lathe, comprising:
   a lathe housing enclosing a space, the lathe housing defining a lateral opening therein;
   a lathe motor enclosed within the lathe housing;
   a lathe chuck connected to the lathe motor and extending from the lateral opening;
   at least one lathe control mounted on a front surface of the lathe housing;
   a top surface of the lathe housing forming a first shelf, the first shelf being of a size and shape to accept at least one lathe tool having a working portion and an elongated handle, the top surface of the lathe housing being flat and without vertical projections;
   a first elastomeric mat having a generally planar extent and configured with a raised perimeter ridge, the first elastomeric mat being of a size corresponding to the size of first shelf at the top surface of the lathe housing, the first elastomeric mat being attached to the top surface at the first shelf to provide an surface on which to place the at least one lathe tool, the first elastomeric mat being of a material and being configured to reduce vibration by a lathe tool placed on the first elastomeric mat while the lathe motor is operating and being structured to prevent lathe tool from rolling off of the first shelf;
   a second shelf extending from a front surface of the lathe housing, the second shelf being of a size and shape to accept at least one lathe tool having a working portion and an elongated handle, the second shelf being flat and without vertical projections; and
   a second elastomeric mat having a generally planar extend and configured with a raised perimeter ridge along at least two sides, the second elastomeric mat being of a size corresponding to the size of the second shelf, the second elastomeric mat being attached to the second shelf to provide an surface on which to place the at least one lathe tool, the first elastomeric mat being of a material and being configured to reduce vibration by a lathe tool placed on the second elastomeric mat while the lathe motor is operating and being structured to prevent lathe tool from rolling off of the second shelf.

15. A tool shelf as claimed in claim 14, wherein the first elastomeric mat is configured with an upwardly extending wall portion that divides the first elastomeric mat into at least two spaces on the first shelf.

16. A tool shelf as claimed in claim 15, wherein at least one of the at least two spaces is configured with an arrangement of parallel ridges.

17. A tool shelf for a rotating machine, comprising:
a housing enclosing a space, the housing defining a lateral opening therein;
a motor enclosed within the housing;
a chuck connected to the motor and extending from the lateral opening;
at least one control mounted on a front surface of the housing;
a top surface of the housing forming a shelf; and
an elastomeric mat having a generally planar extent and configured with a raised perimeter ridge, the first elastomeric mat being of a size corresponding to the size of shelf, the elastomeric mat being attached to the top surface at the shelf to provide an surface on which to place a tool, the elastomeric mat being of a material and being configured to reduce vibration by the tool placed on the elastomeric mat while the motor is operating and being structured to prevent tool from rolling off of the shelf.

18. A tool shelf as claimed in claim 17, wherein the shelf is a first shelf and the elastomeric mat is a first elastomeric mat, and further comprising:
a second shelf extending from a front surface of the housing, the second shelf being of a size and shape to accept a tool, the second shelf being flat and without vertical projections; and
a second elastomeric mat having a generally planar extend and configured with a raised perimeter ridge along at least two sides, the second elastomeric mat being of a size corresponding to the size of the second shelf, the second elastomeric mat being attached to the second shelf to provide an surface on which to place the tool, the first elastomeric mat being of a material and being configured to reduce vibration by the tool placed on the second elastomeric mat while the motor is operating and being structured to prevent the tool from rolling off of the second shelf.

* * * * *